United States Patent [19]
Richey et al.

[11] 3,782,795
[45] Jan. 1, 1974

[54] TAPERED ROLLER BEARING

[75] Inventors: John Cecil Richey, Canton; Ralph E. McKelvey, Louisville; Robert F. Cornish, North Canton; Harry L. Noll, Canton, all of Ohio

[73] Assignee: The Timken Company, Canton, Ohio

[22] Filed: Apr. 6, 1972

[21] Appl. No.: 241,534

[52] U.S. Cl. ............................................. 308/214
[51] Int. Cl. ........................................... F16c 33/00
[58] Field of Search .......................... 308/214, 217

[56] References Cited
UNITED STATES PATENTS

| | | | |
|---|---|---|---|
| 1,307,262 | 6/1919 | Lockwood | 308/217 |
| 1,588,446 | 6/1926 | Chisholm | 308/214 |
| 1,961,134 | 6/1934 | Buckwalter | 308/214 |
| 2,946,633 | 7/1960 | Gothberg | 308/217 |
| 3,675,978 | 7/1972 | McKelvey | 308/214 |

FOREIGN PATENTS OR APPLICATIONS

| | | | |
|---|---|---|---|
| 1,372,300 | 10/1964 | France | 308/217 |

Primary Examiner—Charles J. Myhre
Assistant Examiner—Frank Susko
Attorney—Edward A. Boeschenstein et al.

[57] ABSTRACT

A tapered roller bearing has a pin-type cage for maintaining the proper circumferential spacing between the tapered rollers and in the spaces between the rollers it has cage inserts formed from a composite material containing a dry lubricant. In addition, the cone of the bearing has an insert on the thrust rib thereof, and that insert is likewise formed from a composite material containing a dry lubricant. Should the bearings normal supply of lubricant be depleted, the composite material will give up its dry lubricant and for a limited period of time will provide adequate lubrication for critical bearing surfaces. The cone further has outwardly directed oil holes leading to the juncture of the cone raceway and the adjoining abutment face of the thrust rib, and those holes direct lubricating oil to the abutment face as the cone rotates, particularly during high speed operation when the centrifugal force is large.

11 Claims, 3 Drawing Figures

PATENTED JAN 1 1974   3,782,795

TAPERED ROLLER BEARING

BACKGROUND OF THE INVENTION

This invention relates to bearings and, more particularly, to a bearing which will operate for a substantial time after its normal supply of lubricant has been depleted.

Tapered roller bearings offer many advantages which other types or combinations of bearings do not. For example, a pair of tapered roller bearings will carry extremely heavy radial and thrust loading and the individual bearings may be adjusted against one another to control radial and axial play. Due to their large load carrying capacity in both radial and axial directions, it is often possible to replace a combination of three other bearings with only two tapered roller bearings and still achieve the desired bearing life.

Due to the tapered configuration of the rollers radial loads on the rollers create an axial force component which tends to expel the rollers from the annular space between the two races, that is, from between the cup and cone. This expulsion force is resisted by means of a thrust rib on one of the races, usually the cone. Thus, as the cup and cone rotate relative to each other the large diameter end faces of the tapered rollers bear and slide against the thrust rib. Unless a film of lubricant is maintained between the roller end faces and the thrust rib, the bearing will overheat and fail. During high speed operation, the centrifugal forces imparted to the lubricant tend to direct it away from the thrust rib, and as a result the thrust rib and roller end faces become starved for lubrication, in which case excessive friction develops between them. For this reason, conventional tapered roller bearings are not suited for high speed operation.

To a lesser extent friction and the accompanying heat develops along the tapered raceways of the cup and cone and the conical surfaces of the rollers when the bearing becomes starved for lubrication. However, when the bearing is properly lubricated, a thin film of lubrication exists between the rollers and raceways.

In some machinery it is important to have safety features which will enable the machinery to operate even though its lubricating system is disabled. This is particularly true of helicopters.

SUMMARY OF THE INVENTION

One of the principal objects of the present invention is to provide a tapered roller bearing which will continue to operate for a considerable period of time after its normal supply of lubricant has been depleted. Another object is to provide a tapered roller bearing which carries its own emergency supply of lubrication for both the raceways and thrust rib. A further object is to provide a tapered roller bearing which will operate at extremely high speeds. An additional object is to provide a tapered roller bearing which is ideally suited for use in helicopters. These and other objects and advantages will become apparent hereinafter.

The present invention is embodied in a bearing which includes a low friction material at critical surfaces of the bearing. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
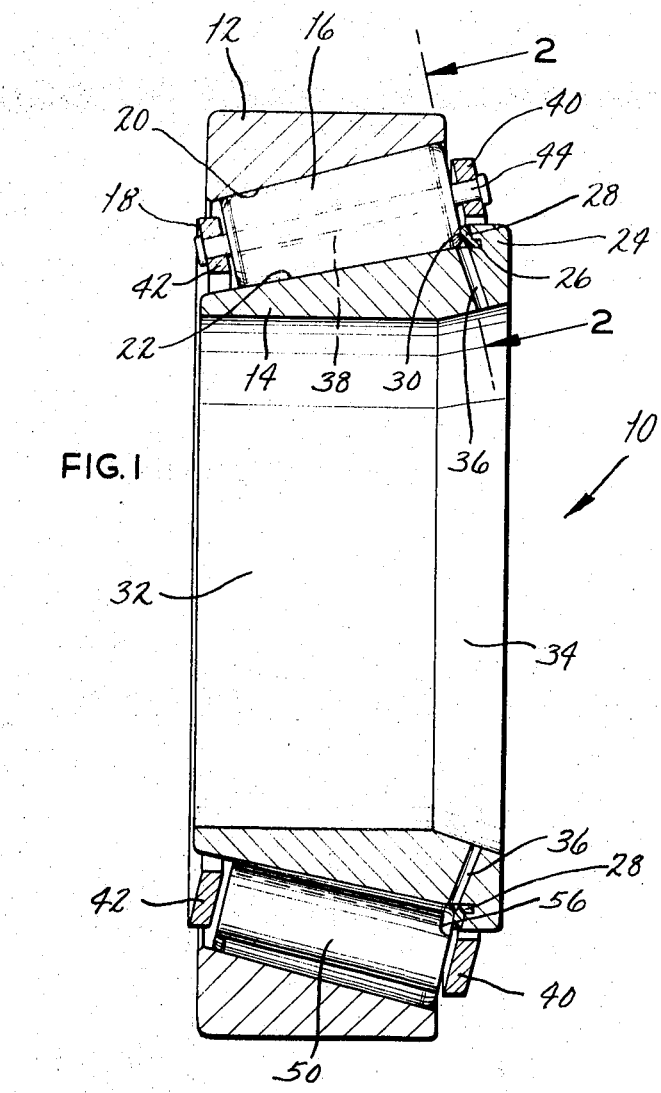
FIG. 1 is a full sectional view of a tapered roller bearing constructed in accordance with and embodying the present invention.
Figure 3:
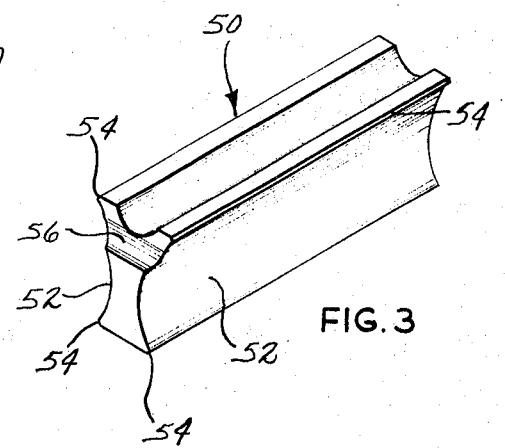
FIG. 3 is a perspective view of one of the composite cage inserts used between adjacent rollers of the bearing.
Figure 2:
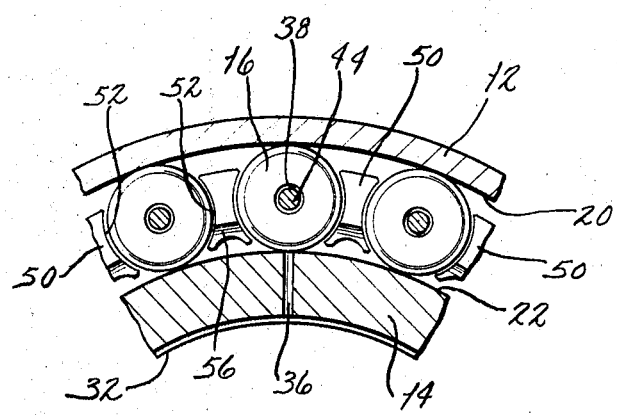
FIG. 2 is a fragmentary sectional view taken along line 2—2 of FIG. 1.

Referring now to the drawings, 10 designates a tapered roller bearing which basically includes a cup 12, a cone 14 disposed within the cup 12, a plurality of tapered rollers 16 positioned between the cup 12 and cone 14, and a cage 18 for maintaining the proper circumferential spacing between the rollers.

The cup 12 is formed from steel and has a tapered raceway 20 on the inwardly presented surface thereof. The surfaces of the cup 12, including its raceway 20, are case hardened.

The cone 14 is also formed from steel and its surfaces are likewise case hardened. The cone 14 has a tapered raceway 22 presented outwardly and disposed opposite to the tapered raceway 20 of the cup. At the large diameter end of the cone raceway 22, the cone 14 is provided with an integrally formed thrust rib 24 having an annular groove 26 which opens toward the interior of the bearing 10. Fitted against the metal portion of the thrust rib 24 and into the annular groove 26 thereof is a rib insert 28 which is formed from a composite material containing a dry lubricant. Actually, the insert 28 is part of the thrust rib 24 and forms an abutment face 30 thereon adjacent to the large diameter end of the cone raceway 22.

Extending through the cone 14 is a cone bore 32 and at the large diameter end of the cone 14, this bore 32 merges into a flared section 34 which is completely surrounded by the thrust rib 24. The cone 14 is further provided with a plurality of outwardly extending oil holes 36 which are spaced at equal circumferential intervals and extend outwardly through the cone 14 from the flared section 34 to the juncture of the abutment face 30 and the cone raceway 22.

The tapered rollers 16 are also formed from steel and have case hardened surfaces. Their conical side faces engage the tapered raceways 20 and 22 of the cup 12 and cone 14, respectively, while their large diameter end faces bear against the abutment face 30 on the insert 28 of the thrust rib 24. Thus, the thrust rib 24 positions the rollers 16 insofar as the axial direction is concerned. The rollers 16 have bores 38 extending axially through the centers thereof.

The cage 18 consists of a pair of cage rings 40 and 42 interconnected by pins 44. The cage ring 40 is slightly larger than the cage ring 42 and encircles the cone 14 at the thrust rib 24 thereof. Its inwardly presented end face is therefore positioned directly opposite the large diameter end faces of the rollers 16. The smaller ring 42 encircles the small diameter end of the cone raceway 22 and therefore is positioned opposite the small diameter end faces of the tapered rollers 16. The pins 44 are rigidly fastened at their ends to the cage rings 40 and 42 and extend through the bores 38 in the tapered rollers 16, a relatively loose fit existing between the two. Consequently, the pins 44 restrict the circumferential movement of the rollers 16 relative to each other and thereby maintain the proper circumferential spacing between the rollers 16.

Interposed between the tapered rollers 16 are cage inserts 50, which like the rib insert 28 are formed from a composite material containing a dry lubricant. Each cage insert 50 has a pair of concave side faces 52, the curvature of which conforms generally to the curvature of the side faces on the two tapered rollers 16 between which that insert 50 is disposed. Some clearance exists between the arcuate surfaces 52 of the insert 50 and the side faces of the rollers 16 on each side of it, but the clearance is not enough to enable the insert 50 to slip inwardly or outwardly away from the rollers 16. In other words, the curvature of the side faces 52 is such that they engage the rollers 16 and prevent the cage inserts 50 from moving relatively inwardly or outwardly a significant distance. In effect the rollers 16 maintain the inserts 50 in place, and the inserts 50 more or less "float" within the cage 18. The clearance between the arcuate faces 52 and the conical side faces of the rollers 16 enables the rollers 16 to receive and convey lubrication in the normal manner. Indeed, each 50 has chamferred corners 54 to facilitate lubrication of the roller side faces. The length of the cage inserts 50 is no greater than the length of the rollers 16. The bottom surface of each insert 50 is also concaved, at least at its center, and is further positioned outwardly from the tapered cone raceway 22, even when the insert 50 is disposed as far inwardly as possible. The outer surface of each insert 50, on the other hand, is flat and is set a considerable distance inwardly from the tapered cup raceway 20. At the large diameter ends of the rollers 16, each cage insert 50 is provided with a relief 56, and this relief 56 is positioned directly opposite the thrust rib insert 28 so that the insert 50 never contacts the insert 28. In other words, the end face of each cage insert 50 will bear against the inside face of the large cage ring 40 before the surface of the relief 56 comes against the abutment face 30 of the thrust rib insert 28. Thus, the cage rings 40 and 42 serve as confining means to maintain the inserts 50 in the proper axial position.

As previously mentioned, both the rib insert 28 and the cage insert 50 are formed from a composite material containing a dry lubricant. Actually, the composite material contains both a binder and the dry lubricant. It may also contain fibers to give strength to the binder. Preferably, the binder is a suitable base resin which is not affected by lubricating oils. The fibers may be glass. Insofar as the rib insert 28 is concerned, the composite material is injection molded against the metal portion of the thrust rib 24, in which case it will flow into the relief 26 or the insert 28 is injection molded separately and bonded to the thrust rib 24. The cage inserts 50 are preferably formed by an injection molding process.

One substance suitable for use as the inserts 28 and 58 is marketed by E.I. DuPont de Nemours of Wilmington, Del., under the trademark Vespel SP-3. This substance contains 85 percent base resin by weight and 15 percent molydenum disulfide by weight. The base resin is the binder and its exact composition is considered proprietary information by Du Pont and accordingly is not available. The molydenum disulfide is the dry lubricant. The Vespel SP-3 composite material may be injection molded into the groove 26 or it may be molded separately and bonded in place. It does not dissolve in nor does it chemically react with conventional high temperature lubricating oils.

Normally, a shaft (not shown) will extend through the cone bore 32 of the cone 14, while the cup 12 will fit into some sort of housing (not shown) which surrounds the shaft. Moreover, the bearing 10 will usually be utilized in conjunction with a similar bearing 10 oriented in the opposite direction so that those two bearings can be adjusted against one another to control the radial and axial play of the shaft. Thus, the bearings 10 serve as a journal for the shaft within the housing.

In operation, the shaft rotates the cone 14 while the cup 12 usually remains stationary with the housing. Lubricating oil is supplied to the space between the cup 12 and the cone 14 at the small diameter end of the cone 14. This oil flows over the outside surfaces of the rotating rollers 16 and establishes a thin film of lubrication between the roller side faces and the tapered raceways 20 and 22. Some of the lubrication finds its way to the abutment face 30 of the insert 28 on the thrust rib 24, and another thin film of lubrication is created between that abutment face 30 and the large diameter end faces of the tapered rollers 16. This is a particularly critical area, inasmuch as the end faces of the rollers slide across the abutment face 30 as the rollers roll along the cone raceway 22.

At extremely high speed operation, the centrifugal forces imparted to the oil by the rotating cone 14 cause the oil to move outwardly toward the cup raceway 20. In this case, additional oil is supplied through the oil holes 36 which lead up to the juncture of the abutment face 30 and the cone raceway 22. This additional oil flows across the abutment face 30 and supplies sufficient lubrication to that face to maintain an oil film on it, even when the bearing 10 is operated at extremely high speeds and is subjected to high centrifugal forces. Indeed, the oil is conveyed through the holes 36 by the centrifugal force and its flow increases with the speed of the cone 14. Thus, even at extremely high speed operation, an adequate film of lubrication is maintained between the abutment face 30 of the insert 28 and the large diameter end faces of the tapered rollers 16.

Should the normal supply of oil to the bearing fail due to an oil line rupture or for any other reason, the oil within the bearing 10 will eventually become depleted. When this occurs, the composite material forming the insert 28 will give up its dry lubricant, and that lubricant will lubricate the large diameter end faces of the tapered rollers 16 and prevent excessive friction from developing between the abutment face 30 and the large diameter end faces of the rollers 16. Likewise, the cage inserts 50 at their arcuate side faces 52 will bear against the conical side faces of the tapered rollers 16, and the composite material from which the inserts 50 are formed will give up its supply of dry lubricant to the conical side faces of the rollers 16. This lubricant will be carried around to the tapered raceways 20 and 22 so that adequate lubrication is maintained between the rollers 16 and the tapered raceways 20 and 22.

Of course, the rib insert 28 and cage insert 50 will wear as they give up the dry lubricant, and indeed they must to release the lubricant. The wear is greatest on the rib insert 28 for it is at this location that the sliding friction exists. However, the wear is not rapid and therefore the rib insert 28 remains intact long enough to detect the oil failure and to permit the shutdown of the machinery without a complete bearing failure. In the case of a helicopter, the wear is slow enough to enable the helicopter to find a safe landing place and to land thereon.

In lieu of molding the rib insert 29 from a composite material containing a dry lubricant, the insert 28 may be formed from LP alloy which comprises hard grains of an intermetallic compound of a Laves Phase structure disposed in a softer matrix. LP alloys are marketed by Du Pont, Wilmington, Del., and are described; in U.S. Pat. Nos. 3,507,775; 3,513,084; 3,180,012; 3,361,560; 3,410,732; 3,257,178; and 3,331,700. The LP alloy may be fitted to the cone 14 as an insert thereon, or it may be sprayed onto the thrust rib 24 of the cone 14 to form the abutment surface 30 thereon.

Still another alternative for reducing the friction along the surface of the abutment face 30 is to utilize boronizing techniques. Actually, such techniques create a hardened case directly on the metal of the thrust rib 24 at the surface of the abutment face 30 thereof. This hardened case has an extremely low coefficient of friction close to that of Teflon. One boronizing process suitable for providing the cone 14, cup 12 and rollers 16 of the bearing 10 with hard, low friction surfaces is the Borkote process developed by Atlantic Advanced Metals, Industrial Bank Building, Providence, R. I. The process is considered proprietary.

This invention is intended to cover all changes and modifications of the example of the invention herein chosen for purposes of the disclosure which do not constitute departures from the spirit and scope of the invention.

What is claimed is:

1. A tapered roller bearing comprising a cup having an inwardly presented tapered raceway, a cone located generally within the cup and having an outwardly presented tapered raceway, and a thrust rib at the large diameter end of the cone raceway, the thrust rib projecting outwardly beyond the large diameter end of the cone raceway and having an abutment face presented adjacent to that raceway; tapered rollers interposed between the cup and the cone with each roller being provided with an axially extending bore, the rollers further having tapered side faces engaged with the tapered raceways and end faces engaged with the abutment face, whereby the abutment face axially positions the rollers, the cup, cone and rollers being in metal-to-metal contact along the raceways; a cage for maintaining the proper spacing between adjacent rollers and including rings positioned beyond the ends of the rollers and pins fastened to and interconnecting the rings, the pins extending through the axial bores of the rollers so as to restrict circumferential movement of the rollers relative to each other; and inserts between the side faces of adjacent rollers and having side faces contoured to conform to the side faces of the rollers, the inserts being loosely fitted between the rollers and movable relative to each other and also movable relative to the cage, the inserts being radially confined by the rollers, whereby the inserts are capable of contacting the side faces at the rollers along their contoured side faces, the inserts at least at their contoured side faces being formed from a composite material containing a dry lubricant so that when the bearing loses its normal supply of lubricant, the composite material will release its lubricant to keep the bearing lubricated.

2. A tapered roller bearing according to claim 1 wherein the inserts are relieved opposite to the abutment face of the thrust rib.

3. A tapered roller bearing according to claim 1 wherein the inserts are molded entirely from the composite material.

4. A tapered roller bearing according to claim 1 wherein the inserts are spaced from both raceways.

5. A tapered roller bearing according to claim 1 wherein the thrust rib has a rib insert formed from a composite material containing a dry lubricant, and the abutment face is at least in part on the composite material, whereby when the bearing loses its normal supply of lubricant the composite material will give up its dry lubricant and prevent excessive friction from developing between the abutment face and the roller end faces.

6. A tapered roller bearing according to claim 5 wherein the cone has at least one oil hole therein extending generally outwardly away from the axes of rotation and terminating in the vicinity of the abutment face where it opens outwardly of the cone, whereby when the cone rotates, oil will be conveyed by centrifugal force to the abutment face.

7. A tapered roller bearing according to claim 1 wherein the cone has at least one oil hole therein extending generally outwardly away from the axis of rotation and terminating in the vicinity of the abutment face where it opens outwardly of the cone, whereby when the cone rotates, oil will be conveyed by centrifugal force to the abutment face.

8. A tapered roller bearing according to claim 1 wherein the abutment face of the thrust rib is hardened by a boronizing process.

9. A tapered roller bearing according to claim 1 wherein the thrust rib carries a low friction alloy, and the abutment surface is on the low friction alloy.

10. A tapered roller bearing according to claim 1 wherein the inserts are detached from the cage and are confined in the axial direction by the rings of the cage.

11. A tapered roller bearing comprising a cup having an inwardly presented tapered raceway, tapered rollers having tapered side faces engaged with the cup raceway, the rollers also having end faces at their large diameter ends, a cone located generally within the cup and having an outwardly presented tapered raceway located opposite to the cup raceway and engaged with the side faces of the rollers; the cone having a thrust rib projecting outwardly beyond the large diameter end of the cone raceway and provided with an abutment face against which the end faces of the rollers bear, the thrust rib further having an insert formed from a composite material containing a dry lubricant and the abutment face being at least in part on the insert so that when the normal supply of lubricant for the bearing is depleted the composite material will give up its dry lubricant and prevent excessive friction from developing between the roller end faces and the abutment face, the cone further having at least one oil hole extending generally outwardly therein and terminating in the vicinity of the abutment face so that oil may be conveyed by centrifugal force to the abutment face as the cone rotates.

* * * * *